United States Patent [19]

Dorfman et al.

[11] 4,195,014

[45] * Mar. 25, 1980

[54] UNSATURED POLYESTER RESINS HAVING IMPROVED FIRE RETARDANCE

[75] Inventors: Edwin Dorfman, Grand Island; Raymond R. Hindersinn, Lewiston; Willis T. Schwartz, Jr., Grand Island, all of N.Y.

[73] Assignee: Hooker Chemicals & Plastics Corp., Niagara Falls, N.Y.

[*] Notice: The portion of the term of this patent subsequent to Apr. 10, 1996, has been disclaimed.

[21] Appl. No.: 761,502

[22] Filed: Jan. 21, 1977

Related U.S. Application Data

[63] Continuation-in-part of Ser. No. 692,624, Jun. 3, 1976, Pat. No. 4,152,368, which is a continuation-in-part of Ser. No. 490,423, Jul. 22, 1974, abandoned, Continuation-in-part of Ser. No. 726,033, Sep. 23, 1976, Pat. No. 4,148,841, which is a continuation-in-part of Ser. No. 514,984, Oct. 10, 1974, Pat. No. 3,983,185, which is a continuation-in-part of Ser. No. 490,423, Jul. 22, 1974, abandoned.

[51] Int. Cl.$^2$ .................. C08K 3/08; C08K 3/10; C08L 67/06

[52] U.S. Cl. .................. 260/45.75 R; 260/45.75 C; 260/45.75 P; 525/13; 525/14; 525/17; 525/43; 525/49; 525/4

[58] Field of Search .................. 260/45.75 C, 45.75 P, 260/45.75 R, 863, 862, 869, 872

[56] References Cited

U.S. PATENT DOCUMENTS

| | | | |
|---|---|---|---|
| 2,610,920 | 9/1952 | Hopkinson | 106/15 FP |
| 3,321,416 | 5/1967 | Raschenbach et al. | 260/2.5 |
| 3,338,845 | 8/1967 | Alzner et al. | 260/2.5 |
| 3,355,439 | 11/1967 | Welch et al. | 260/80 |
| 3,661,843 | 5/1972 | Hechenbleikner et al. | 260/45.75 N |
| 3,821,151 | 6/1974 | Mitchell | 260/45.75 C |
| 3,845,001 | 10/1974 | Mitchell | 260/31.8 R |
| 3,883,482 | 5/1975 | Kroenke | 260/45.75 P |
| 3,903,028 | 9/1975 | Mitchell | 260/45.75 P |
| 3,914,336 | 10/1975 | Baker | 260/863 |
| 3,959,220 | 5/1976 | Hechenbleikner et al. | 260/45.75 C |
| 3,983,185 | 9/1976 | Dorfman et al. | 260/45.75 C |

FOREIGN PATENT DOCUMENTS

643139 7/1964 Belgium.
1387400 12/1964 France.
2236893 2/1975 France .................. 260/45.75 P

OTHER PUBLICATIONS

Gould, "Mechanism and Structure in Organic Chemistry," Holt, Rinehart and Winston, Inc., 1959, p. 500.
Lyons, "The Chemistry and Uses of Fire Retardants," Wiley-Interscience, 1970.

*Primary Examiner*—Allan Lieberman
*Attorney, Agent, or Firm*—Peter F. Casella; James F. Mudd; David A. Stein

[57] ABSTRACT

Unsaturated polyester resins having improved fire retardant properties comprise a halogen-containing unsaturated polyester of a polycarboxylic compound and a polyhydric alcohol together with an additive mixture comprising iron or a compound of iron, copper or a compound of copper, and a compound of molybdenum. The unsaturated polyester resin may be copolymerized with an unsaturated monomer to prepare castings, laminated products, reinforced articles and the like having low burning rates, low smoke generations, and beneficial char formation in the presence of a flame.

67 Claims, No Drawings

UNSATURED POLYESTER RESINS HAVING IMPROVED FIRE RETARDANCE

CROSS-REFERENCE TO RELATED APPLICATIONS

This application is a continuation-in-part of copending U.S. application Ser. No. 692,624, filed June 3, 1976, now U.S. Pat. No. 4,152,368, issued May 1, 1979, which in turn is a continuation-in-part of U.S. application Ser. No. 490,423, filed July 22, 1974, now abandoned.

This application is also a continuation-in-part of applicants' copending application Ser. No. 726,033, filed Sept. 23, 1976, now U.S. Pat. No. 4,148,841, issued April 10, 1979, which in turn is a continuation-in-part of application Ser. No. 514,984, filed Oct. 10, 1974, now U.S. Pat. No. 3,983,185, issued Sept. 28, 1976, which in turn is a continuation-in-part of the aforementioned application Ser. No. 490,423, filed July 22, 1974, now abandoned.

BACKGROUND OF THE INVENTION

During recent decades, the growth of the plastics industry and an ever-increasing use of polymeric materials has coincided with an increasing awareness and concern for the safety hazards, especially fire hazards of materials. The result has been the development of a variety of fire retardant additives and fire retardant polymeric compositions. In past years, the major emphasis in the development of such fire retardant compositions has been in the achievement of low burning rates. More recently, however, there has been an increasing recognition of the hazards of smoke generation during fire and the advantages of char formation in inhibiting combustion. Furthermore, it is now more generally recognized that low burning rates do not necessarily imply or result in low smoke generation or beneficial char formation. As a result, the need is now recognized for the development of improved fire retardant polymeric systems having not only low burning rates, but low smoke generation and high char formation.

Among the developments in the field of fire retardant polymeric systems in recent years, the development of polymeric systems employing antimony trioxide as a fire retardant additive has been outstanding. Antimony trioxide has been found especially effective for use in systems based on halogen containing polymers. The effectiveness of antimony trioxide, as well as other antimony compounds as a fire retardant additive to halogen containing polymers is generally recognized and has been described as a synergistic effect between antimony and halogen. Despite its generally recognized effectiveness in such systems, the use of antimony trioxide, as well as other antimony compounds, has been found to result in certain disadvantages. For example, although the use of antimony compounds has been shown in many instances to advantageously decrease flammability and burning rate of polymer systems, it appears to provide little advantage in inhibiting formation of smoke and in some instances has been found to increase smoke formation. Furthermore, the use of antimony trioxide system may result in the diminution of other useful and desirable properties of polymer systems. Thus, for example, normally translucent polyester resins have been rendered opaque by the incorporation of sufficient quantities of antimony trioxide to render the resins fire retardant. In addition, in recent years, the rapidly rising cost of antimony compounds has been an economic disadvantage.

As a result of these disadvantages associated with the use of antimony compounds as fire retardant additives, considerable effort has been expended in a search for other fire retardant additives. However, the effectiveness of a particular fire retardant additive in a polymeric system is generally unpredictable and an additive useful in one polymeric system may be ineffective or even harmful when used in a different polymeric system. Even more unpredictable is the effect achieved when fire retardant additives are combined. Combinations of various fire retardant additives may result in a beneficial or detrimental formulation with a given polymeric system. Furthermore, combinations of fire retardant additives may benefit one aspect of fire retardance and be detrimental to another.

It is also known from Applicants' copending application Ser. No. 642,026, filed Dec. 18, 1975, which is the continuation-in-part of U.S. application Ser. No. 383,749, filed July 30, 1973, now abandoned, to employ iron compounds as fire retardant additives in halogen-containing unsaturated polyester resins.

In Applicants' U.S. Pat. No. 3,992,480 issued Nov. 16, 1976, filed June 6, 1975 as a continuation-in-part of application Ser. No. 383,747, filed July 30, 1973, now abandoned, it is disclosed that copper compounds can be advantageously employed as fire retardant additives in halogen containing unsaturated polyester resin.

In Applicants' aforementioned copending application Ser. No. 692,624 and the abandoned parent application thereof aforementioned Ser. No. 490,423 of which the present application is a continuation-in-part, it is disclosed that an additive mixture of iron or iron compounds with copper or copper compounds wherein the iron compound can be ferric molybdate or the copper compound can be copper molybdate imparts, synergistically, a low burning rate, low smoke generation and beneficial char formation to halogenated unsaturated polyester compositions.

Accordingly, it is an object of this invention to provide superior fire retardant unsaturated polyester resins that not only have low burning rates, but also exhibit low smoke generation when in contact with a flame.

It is also an object of the invention to provide superior fire retardant polyester resins that develop a beneficial, insulating layer of char in the presence of a flame which inhibits further combustion of the polymer.

It is still another object of the invention to render unsaturated polyester resins fire retardant without diminishing or deteriorating other useful properties of the polymer system.

It is a still further object of the invention to devise a fire retardant additive for unsaturated polyester resins which does not require the presence of antimony or an antimony compound.

These and other objects are accomplished by this invention which is described in detail hereinafter.

SUMMARY OF THE INVENTION

The improved fire retardant polymer compositions of this invention comprise an alpha, beta-ethylenically unsaturated polyester of a polycarboxylic compound and a polyhydric alcohol, the polyester being copolymerizable with an unsaturated monomer and containing a halogen in a proportion of greater than about 4 weight percent and an effective fire retardant proportion of about 0.2 to about 10 weight percent of an additive mixture comprising at least 0.1 weight percent of iron or a compound of iron and at least 0.1 weight percent of copper or a compound of copper and at least 0.1 percent of a compound of molybdenum, the proportions being based on the weight of unsaturated polyester and unsaturated monomer.

It has been found that the present mixture of iron, copper and molybdenum additives imparts flame and smoke retardant effects to halogenated unsaturated polyester resin compositions substantially equivalent to that obtained employing mixtures of iron, copper and antimony additives as described in aforementioned U.S. application Ser. No. 692,624. It is within the scope of this invention to include some antimony additive such as antimony trioxide in the present additive mixture but such mixture of iron, copper, molybdenum and antimony additives is less preferred because of the aforementioned high cost of the antimony additive.

Thus, it will be seen that the present invention relates to compositions containing the aforementioned additive mixture, and in one aspect these compositions comprise a halogen-containing unsaturated polyester, copolymerizable with an unsaturated monomer; in a second aspect, comprise a halogen-containing unsaturated polyester in admixture with a copolymerizable monomer; and in a third aspect, the copolymerized product thereof.

The preferred halogen containing polyesters of the invention are those wherein the halogen is provided by a Diels Alder adduct of a hexahalocyclopentadiene and a polycarboxylic compound or polyhydric alcohol containing aliphatic carbon-to-carbon unsaturation. The preferred adducts are chlorendic acid or chlorendic anhydride.

The additive mixture may contain iron and copper and the molybdenum compound in various forms including various inorganic and organic compounds of each. Based on effectiveness, availability, economic and other considerations, inorganic compounds are preferred. Especially preferred when translucency of the resin is not an objective are the common oxides of iron, copper and molybdenum. However, various other compounds may be selected depending on the properties desired in the cured product. For example, where it is desired to retain the translucent character of the unsaturated polyester, it is advantageous to employ colorless salts, that is compounds of iron and copper and molybdenum that permit the transmission of light when incorporated in the polyester resin system and to minimize the proportions of opaque compounds such as the oxides and employ various colorless salts. It has been found that up to about one half weight percent of an opaque additive may be employed without an undue loss of translucency.

The unsaturated polyester containing the additive mixture of this invention is copolymerizable with an ethylencially unsaturated monomer, preferably a vinyl or vinylidene monomer, to prepare castings, laminated products, reinforced articles and the like having low burning rates, low smoke generation and beneficial char formation in the presence of a flame.

DESCRIPTION OF EMBODIMENTS

The Polyesters

The unsaturated polyesters useful in the invention are generally those commonly known in the art, and are generally the reaction product of a polycarboxylic compound and a polyhydric alcohol. By polycarboxylic compounds is meant the polycarboxylic acids, polycarboxylic anhydrides, polycarboxylic acid halides, and polycarboxylic acid esters. The unsaturation can be provided in either or both the polycarboxylic compound or the polyhydric alcohol. Suitable unsaturated polycarboxylic acids having aliphatic carbon-to-carbon double bonds, and the corresponding acid halides, esters, and anhydrides can include maleic, fumaric, chloromaleic, ethylmaleic, itaconic, citraconic, xeronic, pyrocinchonic, mesaconic, aconitic and acetylene dicarboxylic, either alone or in mixtures.

Illustrative of the unsaturated polyhydric alcohols having aliphatic carbon-to-carbon double bonds, which can be used in providing the unsaturation in the linear polyester molecules are compounds such as butene diol, pentene diol, the unsaturated hydroxy ethers such as allyl or vinyl glycerol ethers, allyl or vinyl pentaerythritol ethers and the like.

The saturated polycarboxylic compounds useful in the preparation of the polyesters can be aliphatic, cycloaliphatic, aromatic or heterocyclic. Illustrative of these polycarboxylic acids, acid halides, acid anhydrides and acid esters include phthalic, isophthalic, terephthalic, tetrachlorophthalic, tetrabromophthalic, dibromotetrahydrophthalic, chlorendic, adipic, succinic, dichlorosuccinic, and mixtures thereof.

Suitable saturated polyhydric alcohols for use in the preparation of the polyester resins include ethylene glycol, diethylene glycol, propylene glycol, dipropylene glycol, butanediol, pentanediol, hexanediol, dibromoneopentyl glycol, neopentyl glycol, 1,4-cyclohexane dimethanol, glycerol, mannitol, sorbitol, bisphenols, substituted bisphenols, hydrogenated bisphenols and mixtures thereof.

The properties of the polyester resins can be modified by the incorporation of suitable monofunctional carboxylic compounds and alcohols. Illustrative examples of such compounds are 2,2-dichloroethanol; 1,1-dibromo-2-propanol; 2,2,2-tribromoethanol; 1,1,3,3-tetrabromo-2-propanol; 1,1,1-trifluoro-2-propanol and 2,3-dibromo-1-propanol. An example of a carboxylic compound is pentachlorophenoxy acetic acid.

The properties of the polyesters can be varied by using mixtures of the various types of acids and alcohols, such as an unsaturated acid, a saturated acid and a saturated alcohol.

The unsaturated polyester resins of this invention contain greater than about 4 weight percent up to about 50 weight percent or more of halogen based on the weight of the unsaturated polyester resin and copolymerizable unsaturated monomer and preferably about 4 to about 40 weight percent. The foregoing broad and preferred ranges are about 4.4 to about 56 weight percent and about 4.4 to about 45 weight percent, respectively, when the ranges are based on the weight of the unsaturated polyester. The preferred halogenated unsaturated polyesters are those wherein the halogen is chlorine or bromine or a combination thereof. The proportion of halogen is preferably greater than 15 weight percent and even more preferably, greater than 20 weight percent when the halogen is chlorine.

The preferred unsaturated polyesters of the invention contain either an adduct of hexahalocyclopentadiene and a polycarboxylic compound containing aliphatic carbon-to-carbon unsaturation or an adduct of hexahalocyclopentadiene and a polyhydric alcohol containing aliphatic carbon-to-carbon unsaturation. The preferred unsaturated polyesters are the reaction products of a polycarboxylic adduct of hexahalocyclopentadiene, another carboxylic compound containing carbon-to-carbon unsaturation and a polyhydric alcohol. Such a product is disclosed and claimed in U.S. Pat. No. 2,779,701, issued Jan. 29, 1957 the disclosure of which is herein incorporated by reference. Other methods for incorporating either a polycarboxylic or polyhydric alcohol adduct of hexahalocyclopentadiene include: (1) the reaction of a polycarboxylic adduct of hexahalocyclopentadiene, an unsaturated polyhydric alcohol containing aliphatic carbon-to-carbon unsaturation, disclosed and claimed in U.S. Pat. No. 2,863,794, issued Dec. 9, 1958; (2) the reaction of a polyhydric alcohol adduct of hexahalocyclopentadiene with a polycarboxylic compound containing aliphatic carbon-to-carbon unsaturation disclosed and claimed in U.S. Pat. No. 2,779,700, issued Jan. 29, 1957; and (3) the reaction of a polyhydric alcohol adduct of hexahalocyclopentadiene with another alcohol containing aliphatic carbon-to-carbon unsaturation and a polycarboxylic acid, disclosed and claimed in U.S. Pat. No. 2,863,795, issued Dec. 9, 1958. An alternate method for incorporating an adduct of hexahalocyclopentadiene into a polyester resin involves reacting an unsaturated polyester resin with a copolymerizable compound containing an adduct of hexahalocyclopentadiene, such as disclosed and claimed in U.S. Pat. No. 2,783,215, issued Feb. 26, 1957. The polyester resins containing the polycarboxylic and polyhydric alcohol adducts of hexahalocyclopentadiene can be modified by incorporating therein saturated carboxylic acids and anhydrides, as disclosed and claimed in U.S. Pat. No. 2,890,144, issued June 9, 1959, and U.S. Pat. No. 2,898,256, issued Aug. 4, 1959. When used in this specification, the term polycarboxylic compound refers to the polycarboxylic acids, acid anhydrides, acid halides and acid esters, of either the aliphatic or aromatic type.

Among the adducts of hexahalocyclopentadiene and polycarboxylic compounds which may be used are; 1,4,5,6,7,7-hexachlorobicyclo-(2.2.1)-5-heptene-2,3-dicarboxylic acid and anhydride, also known as chlorendic acid and anhydride; 1,4,5,6,7,7-hexabromobicyclo-(2.2.1)-5-heptene-2,3-dicarboxylic acid; 1,4,5,6,7,7-hexachloro-2-methylbicyclo-(2.2.1)-5-heptene-2,3-dicarboxylic anhydride; 1,4,5,6,7-tetrachloro-7,7-difluorobicyclo-(2.2.1)-5-heptene-2,3-dicarboxylic acid; 1,4,5,6,7,7-hexachlorobicyclo-(2.2.1)-5-heptene-2-acetic-2-carboxylic anhydride; 5,6,7,8,9,9-hexachloro-1,2,4,4,4a,5,8,8a-octahydro-5,8-methano-2,3-naphthalene dicarboxylic acid and anhydride; 1,2,3,4,5,6,7,7-octachloro-3,6-methano-1,2,3,6-tetra-hydrophthalic acid and anhydride; 2,3-dicarboxy-5,8-endomethylene-5,6,7,8,9,9-hexachloro-1,2,3,4,4a,5,8,8a-octahydronaphthalene anhydride; 2,3-bis(ethylene carboxy)-1,4,5,6,7,7-hexachlorobicyclo(2.2.1)5-heptene; and 1,4,5,6,7,7-hexachlorobicyclo-(2.2.1)-5-heptene-2,3-dicarbonyl chloride.

Among the adducts of hexahalocyclopentadiene and polyhydric alcohols which may be used are: 1,4,5,6,7,7-hexachloro-2,3-bis-hydroxymethylbicyclo-(2.2.1)-5-heptene; 1,4,5,6,7,7-hexachloro-2,3-bis-hydroxymethylbicyclo-(2.2.1)-2,5-heptadiene; 3-(1,4,5,6,7,7-hexachlorobicyclo-(2.2.1)-5-heptene-2-yl)-methoxy-1,2-propanediol; 1,4,5,6-tetrachloro-7,7-difluoro-2,3-bis-hydroxymethylbicyclo-(2.2.1)-5-heptene; 1,4,5,6,7,7-hexabromo-2,3-bis-hydroxy-methylbicyclo-(2.2.1)-5-heptene; 3-(1,4,5,6-tetrachloro-7,7-difluorobicyclo-(2.2.1)-5-heptene-2-yl)-methoxy-1,2-propane diol.

These compounds and methods of preparation are disclosed in U.S. Pat. No. 3,007,958, issued Nov. 7, 1961.

It us also within the scope of the invention to use other halogen-containing polyesters such as those derived from tetrachlorophthalic acid or anhydride, and tetrabromophthalic acid or anhydride.

Halogenated polyesters, especially brominated polyesters for use in the invention can be advantageously prepared by the procedure of Toggweiler et al U.S. Pat. No. 3,536,782. In the latter process, base polyester is prepared by reaction of a polycarboxylic acid reactant comprising at least one alpha, beta ethylenically unsaturated dicarboxylic acid or anhydride containing up to 20 carbon atoms per molecule with at least one compound containing aliphatic unsaturation having a halogenation rate faster than that of the alpha, beta-ethylenically unsaturated dicarboxylic acid or anhydride e.g. polyhydric alcohol containing active unsaturation which is subject to subsequent halogenation or mixtures of at least one polyhydric alcohol with at least one ethylenically unsaturated dicarboxylic acid or anhydride free of alpha, beta ethylenic unsaturation other than aromatic unsaturation; and thereafter is halogenated by reaction with halogen sufficient to produce a halogenated polyester containing 10 to 60 weight percent halogen substituent employing a solvent, such as methylene dichloride, which is not readily susceptible to halogenation and a halogenation temperature of about $-50°$ to $+50°$ C. This technique and the halogenated products thereof (which conveniently may be termed post-halogenated polyesters) are described in greater detail in the aforementioned patent of Toggweiler et al., the pertinent disclosure of which is incorporated herein by reference.

The halogen can be provided in the polyesters of the invention by a combination of the foregoing methods. Thus, an unsaturated polyester can be prepared using a halogenated dibasic acid such as chlorendic acid, and a brominated alcohol such as dibromopropanol.

The polycarboxylic compounds and polyhydric alcohols required in the production of the foregoing halogen-containing adducts and polyesters can be provided by using any of the compounds disclosed hereinbefore.

The temperature for the reaction between polyhydric alcohols and polybasic acids ranges from about one hundred to two hundred degrees Celsius, although higher or lower temperatures can be used. Esterification catalysts such as para-toluene sulfonic acid, benzene sulfonic acid, betanaphthalene sulfonic acid and the like, can be added to the reaction mixture. The proportion of polyhydric alcohol is approximately controlled by the total mole proportion of acids in the esterification reaction mixture. It is also preferred to react the polyhydric alcohols and polybasic acids in roughly equimolar proportion; however, either the acids or alcohols can be used in substantial excess, if it is desired to form a low molecular weight polyester resin.

Unsaturated Monomers

A variety of ethylenically unsaturated monomers can be used for curing or cross-linking the ethylenically unsaturated polyesters. It is generally preferred that addition polymerization be practiced since no by-product ammonia or water is formed, and the problems resulting therefrom are not experienced. The vinylidene monomers useful in curing the thermoplastic unsaturated polymers include vinylic compounds or mixtures thereof capable of cross-linking ethylenically unsaturated polymer chains at their points of unsaturation. Usually they contain the reactive groups $H_2C=C<$. Specific examples include styrene, chlorostyrenes, methyl styrenes such as alpha methyl styrene, p-methyl styrene, chloromethyl styrene, divinyl benzene, indene, unsaturated esters such as: methyl methacrylate, methyl acrylate and other lower aliphatic esters of acrylic and methacrylic acids, allyl acetate, vinyl acetate, diallyl phthalate, diallyl succinate, diallyl adipate, diallyl sebacate, and diethylene glycol bis(allyl carbonate), and vinyl toluene, diallyl chlorendate, diallyl tetrachlorophthalate, ethylene glycol diacrylate, ethylene glycol dimethacrylate, ethylene glycol diethacrylate, and mixtures thereof.

Advantageously the monomer employed contains only carbon and hydrogen or these elements with oxygen. If desired a mixture of monomers may be employed. A particularly desirable mixture of monomers which can be used is a mixture of a vinyl benzene compound and an acrylic compound selected from the group consisting of acrylic acid and methacrylic acid and esters thereof, the weight ratio of vinyl benzene compound to acrylic compound being the about 1:4 to 4:1 with about 20 to about 50 weight percent of said monomer mixture being employed with about 50 to about 80 weight percent of the unsaturated halogen-containing polyester. The aforementioned monomer mixtures and the proportions thereof with the unsaturated halogen-containing polyesters are disclosed in the aforementioned parent application Ser. No. 726,033 and Ser. No. 514,984 which is now U.S. Pat. No. 3,983,185. The monomer may be admixed in the polymer in an amount sufficient to produce a thermoset polymer and the admixture heated to an elevated temperature in the presence of a suitable catalyst to cross-link or cure the polymer. With proper catalyst systems such as cobalt naphthenate and methylethyl ketone peroxide, room temperature cures are obtained.

The cross-linking agent can be advantageously combined with the polymerizable polyester while the unsaturated polyester and the olefinic cross-linking agent are at an elevated temperature thereby facilitating solution and mixing. To prevent premature polymerization at this stage, a polymerization inhibitor is advantageously added to the mixture, or preferably to one of its components prior to mixing, especially if the mixture is to be stored or shipped in commerce prior to curing. Alternatively, or in addition to including a polymerization inhibitor, a catalyst and/or promoter for the copolymerization may be added, particularly if it is desired to make available in commerce a composition which is ready for polymerization and does not require further chemical additions in order to be used, as is commonly known in the art.

The polymerization inhibitors generally are added in the order of 0.001 to 1 weight percent of the mixture. Among the inhibitors which may advantageously be employed to prevent the premature polymerization of the mixture of polymerizable polyester and olefinic cross-linking agents, particularly if the mixture is to be stored or shipped in commerce prior to curing, are substances such as hydroquinone, benzoquinone, para-tertiarybutyl catechol, para-phenylene diamine, trinitrobenzene, picric acid, and the like.

The proportion of olefinic cross-linking agent to unsaturated polyester can be varied within the ultimate limits of each without departing from the scope of the invention, necessary to produce an infusible, insoluble, polyester resin. In general, the concentration of the unsaturated polyester in the olefinic cross-linking agent can vary between about ten and ninety percent and preferably will vary between about 25 and 75 percent. Polymerization catalysts are preferably added to the mixture of unsaturated polyester and olefinic cross-linking agent to effect setting or curing. Catalysts such as benzoyl peroxide, acetyl peroxide, lauryl peroxide, methylethyl ketone peroxide, cumene hydroperoxide and the like are satisfactory. Such catalysts are used in proportions of 0.01 to ten percent of the total resin, depending on the efficiency of their action and whether or not substances which inhibit polymerization are present in the mixture. The polymerization reaction can also be hastened by adding promoters such as metals or metal salts, cobalt resinates, cobalt maleate, cobalt naphthenate and the like, or amines such dibutylamine, or mercaptans such as dodecyl mercaptan. These are used in proportions similar to or smaller than that stated for the catalysts.

The Additive Mixture

The additive mixture which is incorporated in the unsaturated polyester resin in accordance with this invention comprises iron or a compound of iron, copper or a compound of copper, and a compound of molybdenum in a total amount of about 0.2 to about 15 percent and preferably within the range of about 0.5 to about 5 weight percent based on the weight of the unsaturated polyester and copolymerizable unsaturated monomer. The foregoing broad and preferred ranges are about 0.22 to about 150 weight percent, and about 0.56 to about 50 weight percent, respectively, when the range is based on the weight of the unsaturated polyester. The components of the iron-copper-molybdenum additive mixture may vary within the total amount. The proportion of iron or iron compound is at least about 0.1, the proportion of copper or compound of copper is at least about 0.1 and the proportion of the compound of molybdenum is at least about 0.1 (these proportions being each about 0.11 weight percent when based on the weight of the unsaturated polyester). Preferably the components of the additive mixture are present in a ratio based on 100 parts of additive mixture of from about 20 to 80 parts of an iron compound to about 80 to 20 parts of the mixture of a compound of copper and a compound of molybdenum. An especially preferred composition, based on 100 parts of additive mixture, comprises about 20 to about 25 parts of a compound of iron, about 20 to about 25 parts of a compound of copper and about 50 to about 60 parts of a compound of molybdenum.

The Iron Compounds

In the preparation of translucent polyester laminates and other products of the invention, iron salts that permit the transmission of light when incorporated in the cured polyester are preferred. Suitable iron salts are the colorless iron salts such as ferric sulfate hydrates. Other suitable salts which permit light transmission in the cured polyester include ferrous hydroxide, ferrous sulfate, ferrous tartrate, ferrous stannate, ferrous chloride, ferrous ammonium sulfate, and the like.

Other substantially insoluble iron compounds that can be used in accordance with the invention include ferric acetate, ferric formate, ferric borate, ferric tungstate, ferric vandate, ferric molybdate, ferrous tungstate, ferric oxalate, ferric ferrocyanide, ferric chlorendate, and ferric hexachloronorbornene carboxylate. If desired the iron and molybdenum consituents of the present additive mixture of the invention can be present in the same compound, for example, ferric molybdate.

Especially useful in the compositions of the invention are the iron oxides, such as $Fe_2O_3$, $Fe_3O_4$ and FeO. In this specification including the examples thereof and in the claims the formula $Fe_2O_3$ is used to characterize ferric oxide, in its various polymorphoric forms and hydrates, e.g., yellow iron oxide and red iron oxide.

The iron compounds named hereinabove are substantially insoluble in the polyester when admixed with a copolymerizable unsaturated monomer. Also useful are iron compounds that are soluble in the admixture of polyester and copolymerizable unsaturated monomer. Soluble iron compounds which are free of iron-to-carbon bonds are preferred. Useful soluble iron compounds include the metal or metalloxy beta-ketoenolates of the formula:

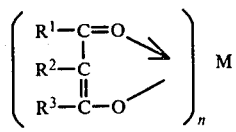

in which M is an iron ion, an ironoxy ion, or an iron hydroxy ion, in which n is an integer equal to the valence of the iron, ironoxy ion or iron hydroxy ion, in which each of $R^1$ and $R^3$ is a substituent selected from the group consisting of hydrogen and an organic substituent selected from alkyl, aryl, cycloalkyl, aralkyl, alkaryl, alkoxy, and aryloxy having one to eight carbon atoms and wherein each aryl substituent is carbocyclic, and in which $R^2$ is selected from the group consisting of $R^1$, $R^3$, halogen, nitro, and sulfo. Typical beta-ketoenolates are the ferrous or ferric acetylacetonates.

Other soluble iron compounds include the iron carboxylates, particularly derivatives of carboxylic acids for example of about 3 to 22 carbon atoms. Illustrative iron carboxylates are iron acrylate, iron oleate, iron naphthenate, iron stearate, iron laurate, iron linoleate, and the like.

The Copper Compounds

In the preparation of translucent polyester laminates and other products of the invention, copper salts that permit the transmission of light when incorporated in the cured polyester are employed. Suitable copper salts are the colorless copper salts such as anhydrous copper sulfate and copper cyanide. Other suitable salts which permit light transmission in the cured polyester include cupric chloride, cupric bromide, copper chloride dihydrate, copper sulfate pentahydrate, copper hydroxide chloride (paratacamite), basic copper chloride (atacamite), copper oxychloride (a mixture of paratacamite and atacamite), copper carbonate, copper borate, and the like. The copper compounds named hereinabove are substantially insoluble in the polyester when admixed with a copolymerizable unsaturated monomer.

Other substantially insoluble copper compounds that can be used in accordance with the invention include copper chlorendate, copper tungstate, copper molybdate, copper tetrafluoroborate, copper thiocyanate, copper chromate, cupric formate, cupric gluconate, cupric oxalate, copper phthalocyanine, cupric tartrate, and the like.

If desired the copper and molybdenum constituents of the additive mixture of the invention may be present in the same compound for example, cupric molybdate.

Especially useful in the compositions of the invention are the copper oxides, such as cuprous and cupric oxides.

Other copper compounds are cupric ethylacetoacetate, copper glycinate, cupric hexafluoroacetylacetonate, cupric hydroxyacetate, cupric lactate, cupric naphthenate, cupric octoate, cupric propionate, cupric stearate, cupric acetylacetonate, cupric butyrate, cupric isobutyrate, cupric citrate, cupric cyclohexanebutyrate, cupric dimethyl dithiocarbamate, cupric trifluoroacetylacetonate and cupric undecylenate.

The Molybdenum Compounds

The molybdenum compound constituent of the additive mixture is preferably molybdenum tri-oxide i.e. molybdenum (VI) oxide. However a wide variety of other molybdenum compounds may be employed, including the various other inorganic compounds of molybdenum as well as the various organic compounds of molybdenum. Inorganic molybdenum compounds include, for example, the molybdenum oxides (including molybdenum (III) oxide, molybdenum (IV) oxide in addition to the aforementioned molybdenum (VI) oxide), molybdenum sulfides, molybdenum tribromide, molybdenum trichloride, molybdenum tetrachloride, molybdenum trifluoride, molybdenum pentafluoride, molybdenum hexafluoride, molybdenum tetraiodide, molybdenum (V) oxide trichloride, molybdenum (VI) oxide tetrachloride, molybdenum dioxide dichloride, molybdenum dioxide difluoride, molybdenum disulfide, molybdenum sesquisulfide, molybdenum pentasulfide, molybdenum hexacarbonyl, molybdenum carbide, molybdenum dioxide dibromide, and the like. Also suitable for use in the invention are molybdic acid and molybdate salts such as ammonium molybdate, sodium molybdate and potassium molybdate as well as polymolybdate salts such as ammonium dimolybdate, ammonium trimolybdate, ammonium tetramolybdate, ammonium paramolybdate ammonium pentamolybdate, sodium decamolybdate, and sodium hexadecamolybdate. Colorless molybdenum compounds such as molybdenum hexacarbonyl and ammonium dimolybdate and the like may be advantageously employed in the preparation of translucent resins.

Organic molybdenum compounds include molybdenum and molybdenyl beta-ketoenolates such as molybdenum (III) acetylacetonate and molybdenyl (VI) bis-acetylacetonate; molybdenum salts of carboxylic acids such as molybdenum (VI) oxalate; and molybdenyl (V) naphthenate; molybdenum salts of phenols such as molybdenum phenoxide as well as molybdenum-complexes of organic amines and nitriles exemplified by molybdenum dioxide dichloride bis-(trimethyl amine), molybdenum dioxide dichloride bis-(pyridines) and molybdenum dioxide dichloride bis-(propionitrile).

Preferable the molybdenum additive employed in the invention is a compound of molybdenum in the positive oxdiation state of six. Preferably also, the molybdenum additive is an inorganic molybdenum compound.

Other iron, copper and molybdenum compounds which have desirable fire retardant properties, but which adversely affect the stability or cure of the polymer compositions can be employed if such compounds are used in an inactive form such as encapsulated or reacted or complexed with another compound. Such compounds include for example, ferric chloride, copper acetylacetonate, cuprous chloride, cupric nitrate, cupric acetate, copper acrylate, copper naphthenate, copper stearate, molybdenum phenoxide and the molybdenum oxide halides. These compounds can be encapsulated for example, with gelatin or other polymeric materials. Alternatively the compounds can be reacted or complexed with compounds such as nitro compounds or aromatic ethers or amines. An example of a suitable compound of this type is an amine salt of ferric chloride. In some instances, iron, copper or molybdenum compounds which are normally detrimental to the stability and/or cure of the resin when employed alone, can be employed without such detriment in a relatively smaller amount as a component in the additive mixture.

As mentioned above the additive mixture may be prepared from compounds which contain two or more of the metallic constituents of the additive mixture such as ferrous molybdate, ferric molybdate, ammonium ferric dodecamolybdate, and a copper molybdate such as cupric molybdate.

The additive mixture is preferably incorporated into the polyesters in a finely divided form. Preferred are particles passing through a 200 mesh standard seive. Where translucent polyester products are desired, the additive mixture should not contain a sufficient quantity of particles in the size range approximating the wavelength of light, i.e., about 0.1 to 1.0 microns, to cause undesirable light scattering and resultant decrease in translucence. In practice it has been observed that iron compounds pulverized to pass completely through a 325 mesh screen contain sufficient fine particles to reduce the translucency of the polyester.

The composition of this invention preferably are essentially phosphorus-free, i.e., exclude phosphorus and compounds of phosphorus.

The Curing Process

The polymerization conditions for effecting the crosslinking reaction between the unsaturated polyesters of this invention and the olefinic cross-linking agent may be selected from a wide variety of techniques but usually involve the application of heat or light. Although pressure is not a required condition for effecting polymerization of the polymerizable mixtures embraced within this invention, it is sometimes advantageously employed, particularly when it is desired to make laminates in preformed shape. The pressures found satisfactory for this purpose are relatively low compared to those required for molding or laminating other type resins than involved herein and may be of the order of that obtained by pressing glass plates having a fiber glass mat or laminate impregnated with the polyester resin sandwiched therebetween.

The temperature at which polymerization is effected depends on a variety of factors, particularly the boiling point of the olefinic cross-linking agent and the exothermic characteristics of the polymerization mixture. A temperature is selected which will give a suitable reaction rate and yet not cause substantial volatilization, and in the case of producing very thick castings, which will not produce a product which is crack-crazed.

The properties of the compositions of this invention can be varied substantially by incorporating modifying agents before, during or after any of the processing steps employed. For example, instead of producing articles of commerce from the compositions of this invention which are in the form of castings or laminates as previously described herein, a foamed type article may be made by incorporating a small percentage of a foaming agent such as sodium bicarbonate into the solution of unsaturated polyester dissolved in mono-olefin and thereafter effecting the copolymerization in the presence of catalyst and heat to produce the foamed article. Formulations which are useful for making moldings embodying the compositions of this invention may be made by mixing into the unsaturated linear polyester and olefinic cross-linking agent mixture, an inert filler such as calcium carbonate, silica and clay or by compounding with chopped fiber glass rovings, macerated fabric, asbestos fibers, mica, etc., which serve as fibrous reinforcing media and incorporating a small percentage of a mold lubricant, catalyst and/or promoter. Auxiliary fire retardant additives such as hydrated alumina can be used to add to the fire retardance provided by the halogen and additive mixture of iron, copper and molybdenum additives.

It is understood that dyes, pigments, plasticizers, lubricants and various other modifying agents are contemplated as being incorporated in certain formulations to produce compositions embraced in this invention in order to obtain or accentuate any given property.

The following examples are presented to illustrate this invention. It is to be understood that the examples are not to be construed as limiting the invention. In the examples and elsewhere in this specification and claims, all temperatures are in degrees Celsius and all parts, proportions and percentages are by weight unless otherwise indicated.

PREPARATION OF POLYESTERS

EXAMPLE 1

1A An unpolymerized unsaturated polyester resin is prepared by esterifying about 157 parts of ethylene glycol and 38 parts of diethylene glycol with about 668 parts of 1,4,5,6,7,7-hexachlorobicyclo-(2.2.1)-5-heptene-2, 3-dicarboxylic acid and about 136 parts of fumaric acid.

1B The additive mixture comprising iron or a compound of iron, copper or a compound of copper and a compound of molybdenum, in proportions described hereinabove, may be admixed with the unsaturated polyester resin prepared as described in Example 1A. The resultant mixture containing the fire retardant additive mixture provides a pre-formulated unsaturated polyester resin which may be readily stored and/or shipped and subsequently further polymerized by reaction with an unsaturated monomer to form a fire retardant polymeric product.

EXAMPLE 2

About 30 parts of styrene and about 70 parts of product produced by the esterification reaction of Example 1A are mixed together until complete solution was obtained to give a clear, substantially colorless solution of liquid polyester resin having a viscosity of about 30 poises at 25 degrees Celsius on a Gardner bubble viscometer and having a chlorine content of about 30 percent by weight of the total.

EXAMPLE 3

2A A liquid unsaturated polyester resin is prepared by esterifying about 157 parts of ethylene glycol and 38 parts of diethylene glycol with 668 parts of 1,4,5,6,7,7-hexachlorobicyclo-(2.2.1)-5-heptene-2, 3-dicarboxylic acid and about 136 parts of fumaric acid at a reaction temperature of about 165° C. for a period of about 10 hours. The unsaturated polyester resin, thus prepared has a final acid number of 49 to 56.

2B About 65 parts of the product produced by the esterification reaction of Example 2A is mixed with about 17.5 parts of styrene and about 17.5 parts of ethyl acrylate until complete solution is obtained, to give a clear, substantially colorless solution of liquid polyester resin having a chlorine content of about 27 weight percent of the total.

EXAMPLES 4–14

In Examples 4–14 castings of the resins of Examples 2 and 3 are prepared and tested for fire retardance with the results shown in the Table below. The castings for Examples 5–14 are prepared by mixing 100 parts by weight of resin solution with a molybdenum compound or a mixture of an iron additive and a molybdenum compound or a mixture of a molybdenum compound with a copper additive and an iron additive in the amount indicated in the Table and 0.2 part of 12 percent cobalt octoate. Example 4 was a comparable casting wherein no metallic flame retardant additive was employed. After at least 10 minutes stirring to assure uniform dispersion of the immiscible materials, the catalyst, methyl ethyl ketone peroxide (60% in dimethyl phthalate), 1 part, is added, the mixtures is stirred for 1 to 2 minutes, poured into a mold and then the mixture is allowed to cure at 25 degrees Celsius for 16 hours and at 65 degrees Celsius for 8 hours. The castings are then removed from the mold and cut into specimen bars for testing. Burn rate and flame time are tested in accordance with the ASTM D-757-65 test method. Smoke density is tested using a modification of the ASTM D-2843-70, test method. Data on light absorption due to smoke obscuration are acquired by a computer which printed out the light absorption and percent smoke at one second intervals. The "Smoke Density Rating" of this modification of the ASTM test is the cumulative percent smoke at 240 seconds. Samples which are used for the ASTM D-2843-70 test in Examples 5–14 measure 1.0 inch × 1.0 inch × 0.125 inch and in Example 4 measure 0.5 inch × 0.5 inch × 0.125 inch.

In the examples the weight percent of additives is based on the weight of the resin. Thus, for example, 1.0 weight percent of an additive compound or mixture indicates one part by weight of the compound or mixture per one hundred parts of polymer composition.

EXAMPLE 15

A post-brominated polyester is prepared in substantial accord with the procedure of U.S. Pat. No. 3,536,782 by esterifying about 361.6 parts of ethylene glycol with 424.5 parts of tetrahydrophthalic anhydride and 237.58 parts of maleic anhydride in the presence of 0.053 parts of tolylhydroquinone polymerization inhibitor under an inert atmosphere of nitrogen gas, recovering the resultant polyester and subjecting 458.75 parts of the polyester product to halogenation with 208.75 parts of molecular bromine in the presence of 668 parts methylene chloride reaction solvent to obtain a post-halogenated polyester which is the brominated product of the ester of ethylene glycol with tetrahydrophthalic anhydride and maleic anhydride. The post-brominated polyester is then mixed with styrene substantially in accordance with the procedure of Example 2 to provide a polyester-styrene mixture containing about 70% post-brominated polyester and 30% styrene.

EXAMPLE 16

Castings of the resin of Example 15 are prepared by a procedure substantially in accord with the method employed for the resins of Examples 2 and 3 above (employing about 130 parts of the styrene-post-brominated polyester mixture of Example 15 for each casting) except that 0.8 parts by volume of the solution of methyl ethyl ketone peroxide in dimethyl phthalate together with 0.18 parts by volume of liquid cobalt octoate (Cobalt Ten Chem manufactured by Mooney Chemicals Inc. containing 12% cobalt octoate) together with 0.12 parts by volume of N,N-dimethylaniline as cure accelerator are used in preparing each casting. The resultant castings are tested for flame and smoke retardant properties substantially as described above for the resins of Examples 2 and 3 except that the "Smoke Density Rating" in the modified ASTM D-757-65 test is the cumulative percent smoke at 60 seconds and the samples used in this test measure 0.5 inch × 0.5 inch × 0.125 inch. The results of these tests are presented in the Table below.

TABLE

| Example No. | Resin Employed | Molybdenum Additive | % | Iron Additive | % | Copper Additive | % | ASTM-2843 Smoke Density Rating (%) | ASTM D-757-65 Burn Rate (in./min.) | ASTM D-757-65 Flameout Time (secs.) |
|---|---|---|---|---|---|---|---|---|---|---|
| 4 (control) | Ex. 2 | none | — | none | — | none | — | 63 | 0.25 | 140–170 |
| 5 (control) | " | MoO$_3$ | 5 | " | — | " | — | 90 | 0.15 | 113 |
| 6 (control) | " | MoO$_3$ | 3 | Fe$_2$O$_3$* | 2 | " | — | 75 | 0.07 | 57 |
| 7 (control) | " | none | — | Fe$_2$O$_3$* | 5 | " | — | 77 | 0.16 | 57 |
| 8 | " | MoO$_3$ | 3 | Fe$_2$O$_3$* | 1 | CuO | 1 | 74 | 0.07 | 3*** |
| 9 (control) | " | ADM** | 5 | none | — | none | — | 89 | 0.13 | 100 |
| 10 (control) | " | ADM** | 3 | Fe$_2$O$_3$* | 2 | " | — | 78 | 0.14 | 65 |
| 11 | " | ADM** | 3 | Fe$_2$O$_3$* | 1 | CuO | 1 | 79 | 0.07 | 0 |
| 12 (control) | Ex. 3 | MoO$_3$ | 3 | none | — | none | — | 86 | 0.55 | 177 |
| 13 (control) | " | MoO$_3$ | 2 | Fe$_2$O$_3$* | 1 | none | — | 52 | 0.25 | 134 |
| 14 | " | MoO$_3$ | 1 | Fe$_2$O$_3$* | 1 | CuO | 1 | 57 | 0.35 | 173 |
| 16 | Ex. 15 | MoO$_3$ | 3 | Fe$_2$O$_3$* | 1 | CuO | 1 | 27.2 | 0.07 | 72.5 |

*charged as the monohydrate "yellow iron oxide"
**ammonium dimolybdate of the formula (NH$_4$)$_2$Mo$_2$O$_7$
***burning characterized by development of an excellent bulky char In the foregoing Table comparison of the results of control Example 6 with the results of control Examples 5 and 7 indicates that combination of iron and molybdenum additives in a halogen-containing unsaturated polyester resin improves the smoke density rating, burn rate, and flameout time of the resin (at equal loadings of metallic additive in the resin). Comparison of the results of the aforementioned Example 7 with those of Example 8 which illustrates the invention indicates that the presence of copper additive together with the molybdenum and iron additives further improves the smoke density rating, the burn rate and the flameout time of the resin.

Various departures and modifications can be made in the foregoing experimental procedures without departing from the spirit or the scope of the invention. For example, cupric sulfate can be used in place of cupric oxide and ferric sulfate can be employed instead of ferric oxide to give a substantially similar result.

Similarly use of other alpha beta unsaturated polyesters (containing halogen in accordance with the invention) as described in the above section entitled "The Polyesters" in place of the polyester of the Examples provide substantially similar results. In place of styrene, vinyl toluene provides substantially similar results. In place of the ethyl acrylate comonomer of the Examples 13–14 use of a hydroxyalkyl acrylate or methacrylate having 1 to 8 carbon atoms in the alkyl group (such as 2-hydroxyethyl acrylate or 2-hydroxyethyl methacrylate, respectively) or a haloalkyl acrylate or methacrylate having 1 to 8 carbon atoms in the alkyl group (such as 2-chloroethylacrylate or 2-chloroethylmethacrylate, respectively) also provides results substantially similar to those obtained in said Examples.

The foregoing specification is intended to illustrate the invention with certain preferred embodiments, but it is understood that the details disclosed herein can be modified (as is illustrated hereinabove) without departing from the spirit and scope of the invention.

We claim:

1. In a copolymerizable mixture of an unsaturated polyester composition and a copolymerizable ethylenically unsaturated monomer reactant capable of copolymerization to form a fire retardant polymer composition, said unsaturated polyester composition comprising a halogenated alpha, beta-ethylenically unsaturated polyester of a polycarboxylic compound and a polyhydric alcohol, which contains halogen in a proportion of about 4 up to about 50 weight percent, the proportion of said ethylenically unsaturated monomer to said unsaturated polyester composition being that necessary to produce on reaction of said ethylenically unsaturated monomer with said unsaturated polyester composition an infusible polyester resin, the improvement wherein said mixture contains an effective fire retardant proportion of about 0.2 to about 15 weight percent of an additive mixture consisting essentially of at least 0.1 weight percent of iron or an iron compound, at least 0.1 weight percent of a molybdenum compound and at least 0.1 weight percent of a copper or a copper compound; said proportions being based on the weight of the copolymerizable mixture.

2. The composition of claim 1 wherein the composition is substantially free of phosphorus or a compound of phosphorus.

3. The composition of claim 2 wherein the halogen is present in the polycarboxylic compound of the unsaturated polyester.

4. The composition of claim 3 wherein the halogen is chlorine.

5. The composition of claim 4 wherein the polycarboxylic compound is chlorendic acid or chlorendic anhydride.

6. The composition of claim 4 wherein the polycarboxylic compound is tetrachlorophthalic acid or tetrachlorophathalic anhydride.

7. The composition of claim 3 wherein the halogen is bromine.

8. The composition of claim 7 wherein the polycarboxylic compound is tetrabromophthalic acid or tetrabromophthalic anhydride.

9. The composition of claim 3 wherein the polyhydric alcohol is a mixture of ethylene glycol and diethylene glycol.

10. The composition of claim 3 wherein the polyhydric alcohol is propylene glycol.

11. The composition of claim 2 wherein the unsaturated monomer reactant consists of carbon and hydrogen or carbon, hydrogen and oxygen.

12. The composition of claim 11 wherein the unsaturated monomer reactant is styrene.

13. The composition of claim 11 wherein the unsaturated monomer reactant is vinyl toluene.

14. The composition of claim 2 wherein the additive mixture comprises a compound of iron.

15. The composition of claim 2 wherein the additive mixture comprises a compound of copper.

16. The composition of claim 2 wherein the additive mixture comprises a compound of iron and a compound of copper.

17. The composition of claim 2 wherein the additive mixture comprises a compound molybdenum in the positive oxidation state of six.

18. The composition of claim 2 wherein the additive mixture comprises an inorganic compound of molybdenum.

19. The composition of claim 16 wherein the additive mixture comprises an oxide of iron, an oxide of copper and an inorganic compound of molybdenum in the positive oxidation state of six.

20. The composition of claim 16 comprising about 0.5 to about 5 weight percent of the additive mixture wherein the components of said additive mixture are present in a ratio of from about 20 to 80 parts of an iron compound to from about 80 to 20 parts of the mixture of the copper compound and the molybdenum compound.

21. The composition of claim 20 wherein the additive mixture comprises an oxide of iron and an oxide of copper.

22. The composition of claim 21 wherein the molybdenum compound is molybdenum trioxide or ammonium dimolybdate.

23. The composition of claim 22 comprising about 0.5 to about 5 weight percent of the additive mixture wherein the compounds of said additive mixture are present in a ratio of from about 20 to about 25 parts of an oxide of iron; from about 20 to about 25 parts of an oxide of copper; and from about 50 to about 60 parts of the molybdenum compound.

24. The composition of claim 14 wherein the compound of iron is ferric oxide.

25. The composition of claim 14 wherein the compound of iron is ferric sulfate.

26. The composition of claim 15 wherein the compound of copper is cupric oxide.

27. The composition of claim 15 wherein the compound of copper is cupric sulfate.

28. The composition of claim 18 wherein the compound of molybdenum is molybdenum trioxide.

29. The composition of claim 18 wherein the compound of molybdenum is ammonium dimolybdate.

30. In a fire retardant polymer composition, copolymerizable with an unsaturated monomer, said composition comprising a halogenated alpha, beta-ethylenically unsaturated polyester of a polycarboxylic compound and a polyhydric alcohol, the polyester containing halogen in a proportion of about 4.4 up to about 56 weight percent, the improvement wherein the polyester contains an effective fire retardant proportion of between about 0.22 and about 150 weight percent of an additive mixture consisting essentially of at least 0.11 weight percent of iron or an iron compound, at least 0.11 weight percent of a molybdenum compound and at least 0.11 weight percent of a copper or a copper compound; said proportions being based on the weight of unsaturated polyester.

31. The composition of claim 30 wherein the composition is substantially free of phosphorus or a compound of phosphorus.

32. The composition of claim 31 wherein the halogen is present in the polycarboxylic compound of the unsaturated polyester.

33. The composition of claim 31 wherein the halogen is chlorine.

34. The composition of claim 33 wherein the polycarboxylic compound is chlorendic acid or chlorendic anhydride.

35. The composition of claim 33 wherein the polycarboxylic compound is tetrachlorophthalic acid or tetrachlorophthalic anhydride.

36. The composition of claim 31 wherein the halogen is bromine.

37. The composition of claim 36 wherein the polycarboxylic compound is tetrabromophthalic acid or tetrabromophthalic anhydride.

38. The composition of claim 31 wherein the additive mixture comprises a compound of iron.

39. The composition of claim 31 wherein the additive mixture comprises a compound of copper.

40. The composition of claim 31 wherein the additive mixture comprises an inorganic compound of molybdenum in the positive oxidation state of six.

41. The composition of claim 40 wherein the additive mixture comprises an oxide of iron and an oxide of copper.

42. The composition of claim 31 wherein the additive mixture comprises about 20 to 80 parts of an iron compound and about 80 to 20 parts of the mixture of a copper compound and the molybdenum compound.

43. The composition of claim 42 wherein the additive mixture comprises ferric oxide and cupric oxide.

44. The composition of claim 42 wherein the additive mixture comprises molybdenum trioxide or ammonium dimolybdate.

45. The composition of claim 42 wherein the additive mixture comprises about 20 to about 25 parts of ferric oxide; about 20 to about 25 parts of cupric oxide; and about 50 to about 60 parts of the molybdenum compound.

46. The composition of claim 38 wherein the compound of iron is ferric oxide.

47. The composition of claim 38 wherein the compound of iron is ferric sulfate.

48. The composition of claim 39 wherein the compound of copper is cupric oxide.

49. The composition of claim 39 wherein the compound of copper is cupric sulfate.

50. The composition of claim 40 wherein the compound of molybdenum is molybdenum trioxide.

51. The composition of claim 40 wherein the compound of molybdenum is ammonium dimolybdate.

52. The composition of claim 1 when polymerized to an infusible product.

53. In a fire retardant polymer composition comprising a polymerized reaction product of:

(a) an unsaturated polyester of chlorendic acid or anhydride, an unsaturated dicarboxylic acid or anhydride and a polyhydric alcohol, containing chlorine in a proportion of about 15 up to about 50 weight percent; and (b) an ethylenically unsaturated monomer, the proportion of said ethylenically unsaturated monomer to said unsaturated polyester being that necessary to produce on reaction of said ethylenically unsaturated monomer with said unsaturated polyester an infusible polyester resin; the improvement wherein the polymer composition contains a fire retardant proportion of about 0.5 to about 5 weight percent of an additive mixture of metal compounds consisting essentially of at least 0.1 weight percent of an iron compound, at least about 0.1 weight percent of a copper compound and at least about 0.1 weight percent of a molybdenum compound wherein said compounds permit the transmission of light; said composition being substantially free of phosphorus or a compound of phosphorus and said proportions being based on the weight of the copolymerized reaction product.

54. The composition of claim 7 wherein the polyester is a post-brominated polyester.

55. The composition of claim 54 wherein the post-brominated polyester is the brominated product of the ester of ethylene glycol with tetrahydrophthalic anhydride and maleic anhydride.

56. The composition of claim 31 wherein the halogen is bromine.

57. The composition of claim 56 wherein the polyester is a post-brominated polyester.

58. The composition of claim 57 wherein the post-brominated polyester is the brominated product of the ester of ethylene glycol with tetrahydrophthalic anhydride and maleic anhydride.

59. The composition of claim 1 wherein the monomer reactant is a mixture of monomers comprising a vinyl benzene compound and an acrylic compound selected from the group consisting of acrylic acid methacrylic acid and esters thereof. The weight ratio of vinyl benzene compound to acrylic compound being about 1:4 to about 4:1, the weight proportion of unsaturated halogen-containing polyester in said composition being from about 50 to 80 weight percent and the weight proportion of monomer reactant being from about 20 to 50 weight percent of the composition.

60. The composition of claim 59 wherein the composition is substantially free of phosphorus or a compound of phosphorus.

61. The composition of claim 60 wherein the halogen is bromine.

62. The composition of claim 61 wherein the polyester is a post-brominated polyester.

63. The composition of claim 60 wherein said mixture of unsaturated monomers comprises a mixture of styrene and an acrylic compound selected from the group consisting of alkyl acrylates, alkyl methacrylates, hydroxyalkyl acrylates, hydroxyalkyl methacrylates, haloalkyl acrylates, and haloalkyl methacrylates wherein the alkyl group is from 1 to 8 carbon atoms.

64. The composition of claim 63 wherein the monomers of the monomer mixture consist of carbon and hydrogen or carbon, hydrogen and oxygen.

65. The composition of claim 64 wherein the acrylic compound is an alkyl acrylate.

66. The composition of claim 65 wherein the alkyl acrylate is ethyl acrylate.

67. The composition of claim 60 when polymerized to an infusible product.

* * * * *